(12) United States Patent
Lehmann et al.

(10) Patent No.: US 12,719,508 B2
(45) Date of Patent: Aug. 25, 2026

(54) METHODS AND DEVICES FOR SELECTIVELY AMPLIFYING MULTIPLE CARRIERS IN DIFFERENT FREQUENCY BANDS

(71) Applicant: Molex, LLC, Lisle, IL (US)

(72) Inventors: Lars Lehmann, Wildau (DE); Helmut Kautge, Stahnsdorf (DE); Thomas Bartsch, Zossen (DE)

(73) Assignee: Molex, LLC, Lisle, IL (US)

( * ) Notice: Subject to any disclaimer, the term of this patent is extended or adjusted under 35 U.S.C. 154(b) by 451 days.

(21) Appl. No.: 18/223,046

(22) Filed: Jul. 18, 2023

(65) Prior Publication Data

US 2024/0097713 A1 Mar. 21, 2024

Related U.S. Application Data

(60) Provisional application No. 63/407,188, filed on Sep. 16, 2022.

(51) Int. Cl.
*H04B 1/00* (2006.01)
*H04B 1/04* (2006.01)
*H04B 1/68* (2006.01)

(52) U.S. Cl.
CPC ......... *H04B 1/0057* (2013.01); *H04B 1/0483* (2013.01); *H04B 1/68* (2013.01)

(58) Field of Classification Search
CPC .... H04B 1/005; H04B 1/0053; H04B 1/0057; H04B 1/006; H04B 1/0408; H04B 1/0483; H04B 2001/0408; H04B 1/38; H04B 1/3822; H04B 1/68
See application file for complete search history.

(56) References Cited

U.S. PATENT DOCUMENTS 9,602,148 B2 3/2017 Nast et al.
10,536,184 B2 1/2020 Nast et al.
11,329,684 B2 * 5/2022 Zhan ........................ H04B 1/38
11,362,692 B2 * 6/2022 Beaudin ................. H04B 1/005
(Continued)

FOREIGN PATENT DOCUMENTS

DE 102015211278 A1 12/2016
DE 102019208987 A1 12/2020
WO 2019086703 A1 5/2019

*Primary Examiner* — Quochien B Vuong

(57) ABSTRACT

Exemplary embodiments are disclosed of methods and devices (e.g., circuit, compensator, repeater, booster, signal amplifier device, etc.) for selectively amplifying multiple carriers in different frequency bands (e.g., 5G, 4G, etc.). In an exemplary embodiment, a circuit includes a detector configured for detecting carriers in different frequency bands, multiple signal paths respectively configured for amplifying multiple carriers in different frequency bands, and a control unit configured for controlling the detector and the multiple signal paths. The control unit is further configured to: select the carrier(s) to be compensated based on one or more first specified conditions and allow transmission of the selected carrier(s) along the corresponding signal path(s) for amplification; and lock the signal path(s) associated with the frequency band(s) of the unselected carrier(s) to prevent transmission of the unselected carrier(s) along the locked signal path(s) until one or more second specified conditions are satisfied.

19 Claims, 11 Drawing Sheets

(56) References Cited

U.S. PATENT DOCUMENTS

| | | | | |
|---|---|---|---|---|
| 2013/0163482 | A1* | 6/2013 | Suzuki ................. | H04B 1/0057<br>370/278 |
| 2020/0395973 | A1 | 12/2020 | Nast et al. | |
| 2021/0409105 | A1 | 12/2021 | Ashworth et al. | |
| 2022/0263526 | A1 | 8/2022 | Kautge et al. | |

* cited by examiner

METHODS AND DEVICES FOR SELECTIVELY AMPLIFYING MULTIPLE CARRIERS IN DIFFERENT FREQUENCY BANDS

RELATED APPLICATION

This application claims priority to U.S. Provisional Patent Application Ser. No. 63/407,188 filed Sep. 16, 2022, which is incorporated herein by reference in its entirety.

TECHNICAL FIELD

This disclosure relates to methods and devices (e.g., circuit, compensator, repeater, booster, signal amplifier device, etc.) for selectively amplifying multiple carriers in different frequency bands.

DESCRIPTION OF RELATED ART

In a modern vehicle, it can be expected that radio frequency (RF) signals will be sent and/or received from the vehicle. Whether it is an operator's and/or passenger's personal mobile device or a system in the vehicle that is intended to communicate with the outside world, RF signals will need to be emitted and/or received. As can be appreciated, however, the design of a vehicle is poorly suited to transmit RF signals as the substantial use of metal acts to attenuate the signal substantially.

To account for the attenuation, a repeater can be provided to eliminate signal loss inside the vehicle. For example, a repeater may be used to amplify RF signals from a mobile phone or other user equipment (UE) within a vehicle. Or, for example, a repeater may be used to amplify RF signals between a terminal device (e.g., a coupling antenna on a wireless charger, etc.) and an antenna (e.g., a vehicle roof antenna, etc.).

SUMMARY

This section provides a general summary of the disclosure and is not a comprehensive disclosure of its full scope or all of its features.

Exemplary embodiments are disclosed of methods and devices (e.g., circuit, compensator, repeater, booster, signal amplifier device, etc.) for selectively amplifying multiple carriers in different frequency bands. For example, the methods and devices disclosed herein may be used for selectively amplifying radio frequency (RF) signals in different frequency bands (e.g., 5G bands n41 and n78, 4G bands 5 and 2, etc.) between a terminal device (e.g., mobile phone, user equipment within a vehicle, a coupling antenna on a wireless charger, etc.) and an antenna (e.g., a vehicle roof antenna, etc.) or antenna connection, etc.

In an exemplary embodiment, a circuit includes a detector configured for detecting carriers in different frequency bands, multiple signal paths respectively configured for amplifying multiple carriers in different frequency bands, and a control unit configured for controlling the detector and the multiple signal paths. The control unit is further configured to: select the carrier(s) to be compensated based on one or more first specified conditions and allow transmission of the selected carrier(s) along the corresponding signal path(s) for amplification; and lock the signal path(s) associated with the frequency band(s) of the unselected carrier(s) to prevent transmission of the unselected carrier(s) along the locked signal path(s) until one or more second specified conditions are satisfied.

Further areas of applicability will become apparent from the description provided herein. The description and specific examples in this summary are intended for purposes of illustration only and are not intended to limit the scope of the present disclosure.

DRAWINGS

The present application is illustrated by way of example and not limited in the accompanying figures in which like reference numerals indicate similar elements and in which.

Figure 5:
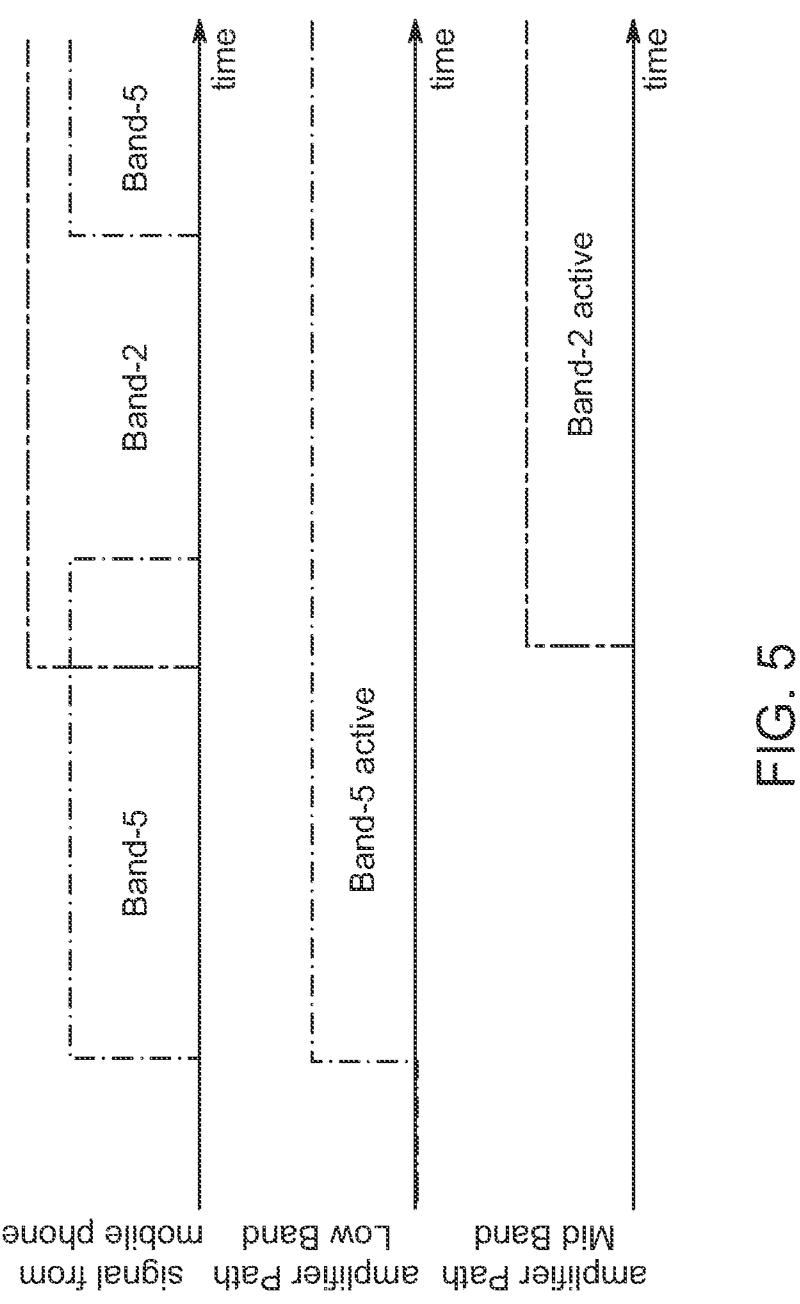

FIG. 5 includes three graphs showing Band-5 and Band-2 signals respectively from a mobile phone, an active state of the amplifier path for Low Band (LB), and an active state of the amplifier path for Mid Band (MB).

Figure 6:
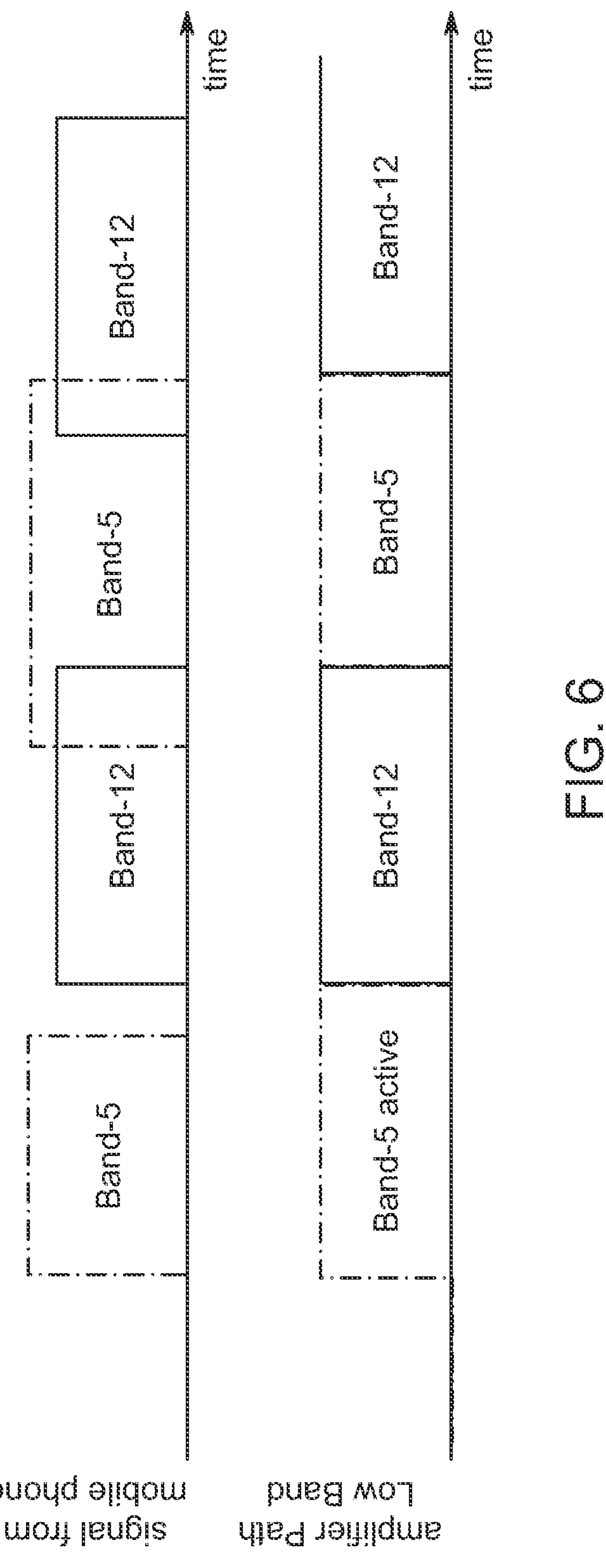

FIG. 6 includes two graphs showing Band-5 and Band-12 signals respectively from a mobile phone and an active state of the amplifier path for Low Band (LB).

Figure 7:
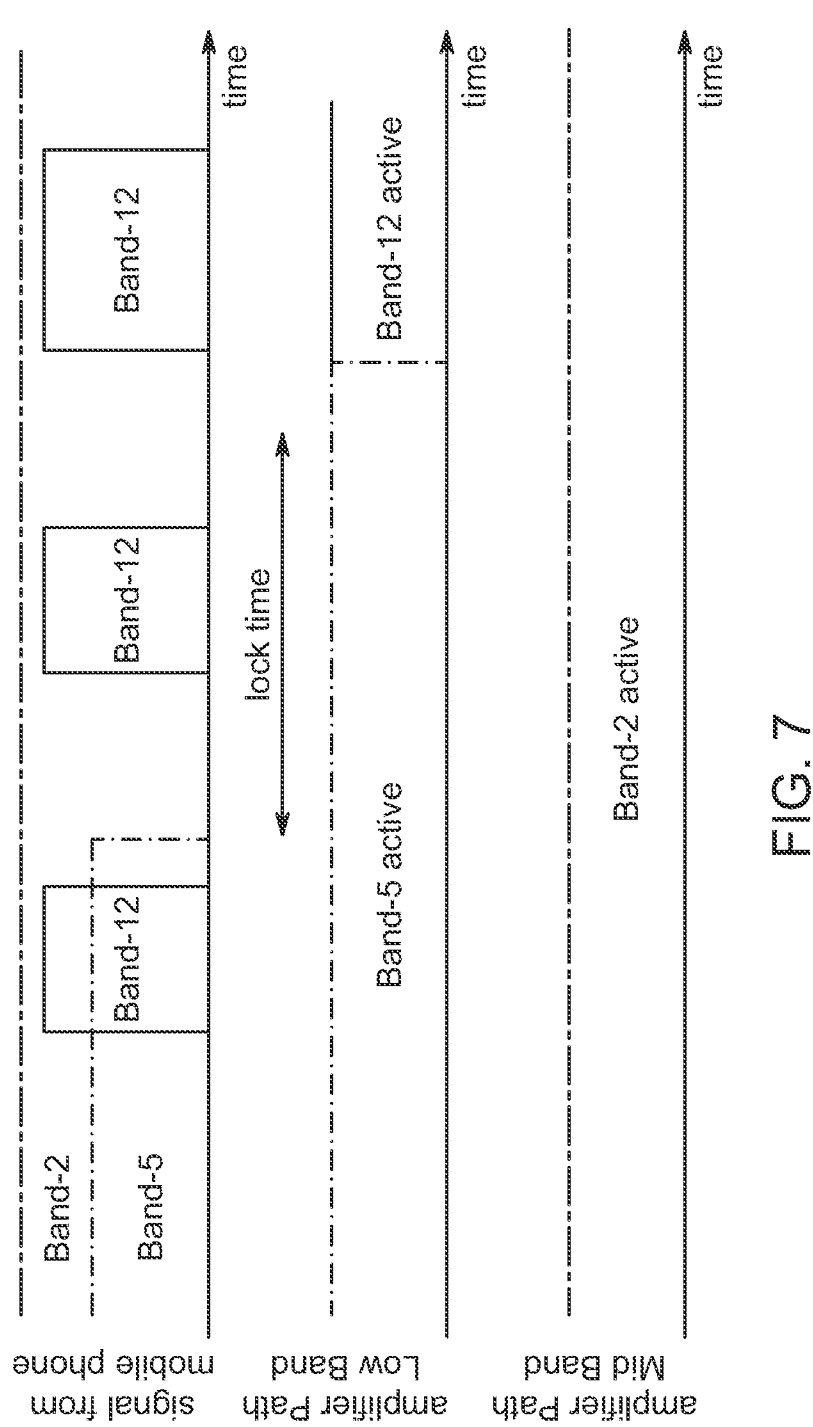

FIG. 7 includes three graphs showing Band-2, Band-5, and Band-12 signals respectively from a mobile phone, an active state of the amplifier path for Low Band (LB), and an active state of the amplifier path for Mid Band (MB). In this example, if no Band-5 signal is detected for a specified period of time (e.g., 10 milliseconds (ms), 40 ms, 100 ms, 200 ms, etc.), and the Band-12 is detected, then the Low Band amplifier path is deactivated for Band-5 and activated for Band-12, whereby Band-12 is amplified along the Low Band amplifier path.

Figure 8:
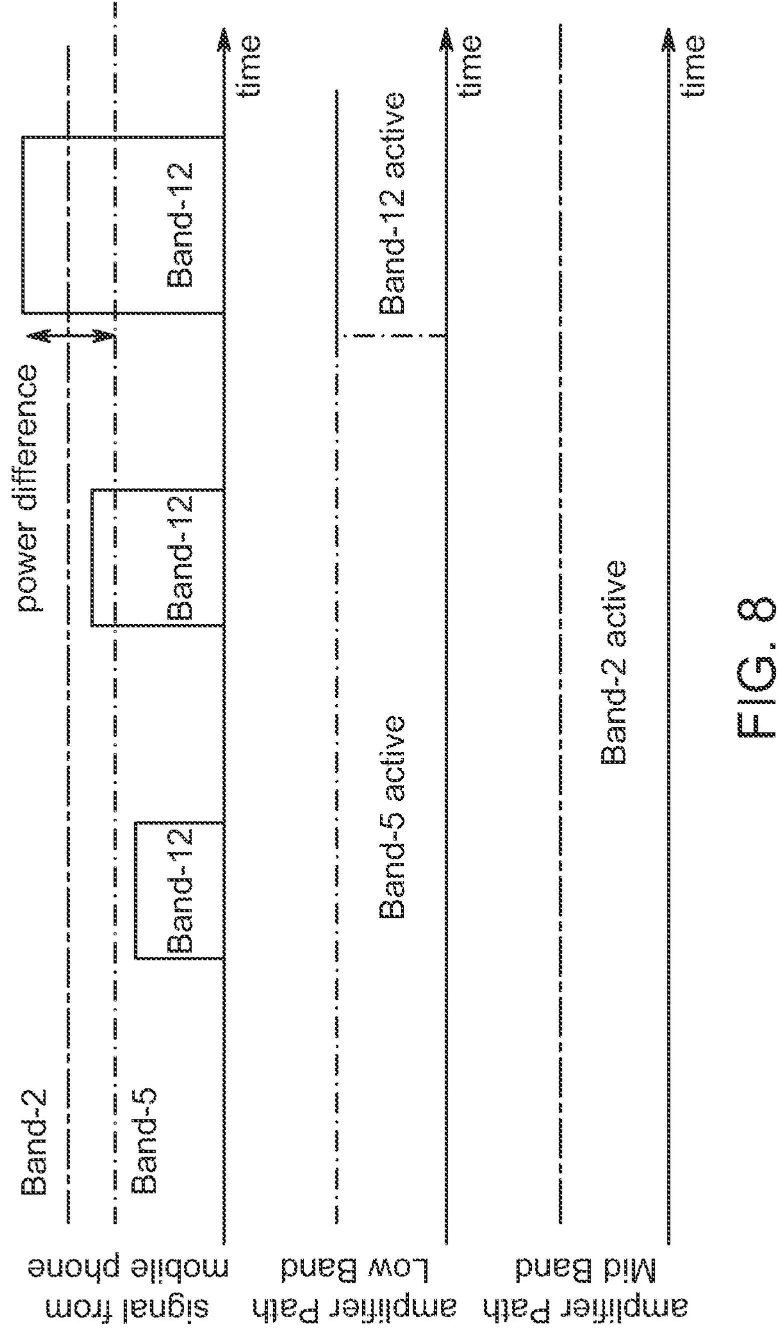

FIG. 8 includes three graphs showing Band-2, Band-5, and Band-12 signals respectively from a mobile phone, an active state of the amplifier path for Low Band (LB), and an active state of the amplifier path for Mid Band (MB). In this example, Band-5 is on hold until Band-12 is detected with a higher power than Band-5. This deactivates Band-5 and activates Band-12, whereby Band-12 is amplified along the Low Band amplifier path. The power of the newly activated Band-12 should be higher than the power of the active band preferably by a specified amount of 10 decibels (dB) or more (e.g., 10 dB, 20 dB, more than 20 dB, etc.).

Figure 9:
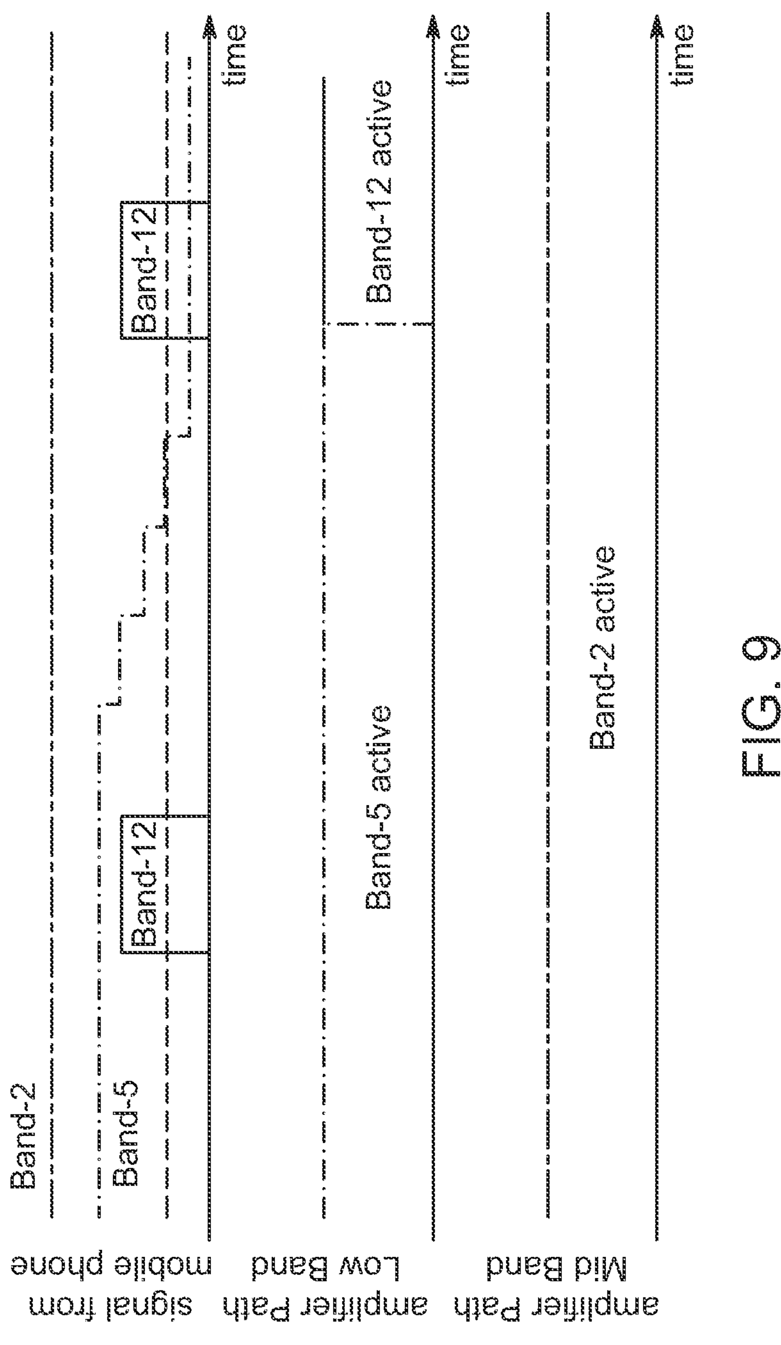

FIG. 9 includes three graphs showing Band-2, Band-5, and Band-12 signals respectively from a mobile phone, an active state of the amplifier path for Low Band (LB), and an active state of the amplifier path for Mid Band (MB). In this example, Band-5 is on hold until the detected power of the Band-5 signal falls below a specified threshold (e.g., −40 decibel-milliwatts (dBm), −30 dBm, −20 dBm, etc.). When Band-5 signal is below the threshold and Band-12 signal is detected, then Band-5 is deactivated and Band-12 activated, whereby Band-12 is amplified along the Low Band amplifier path.

Figure 10:
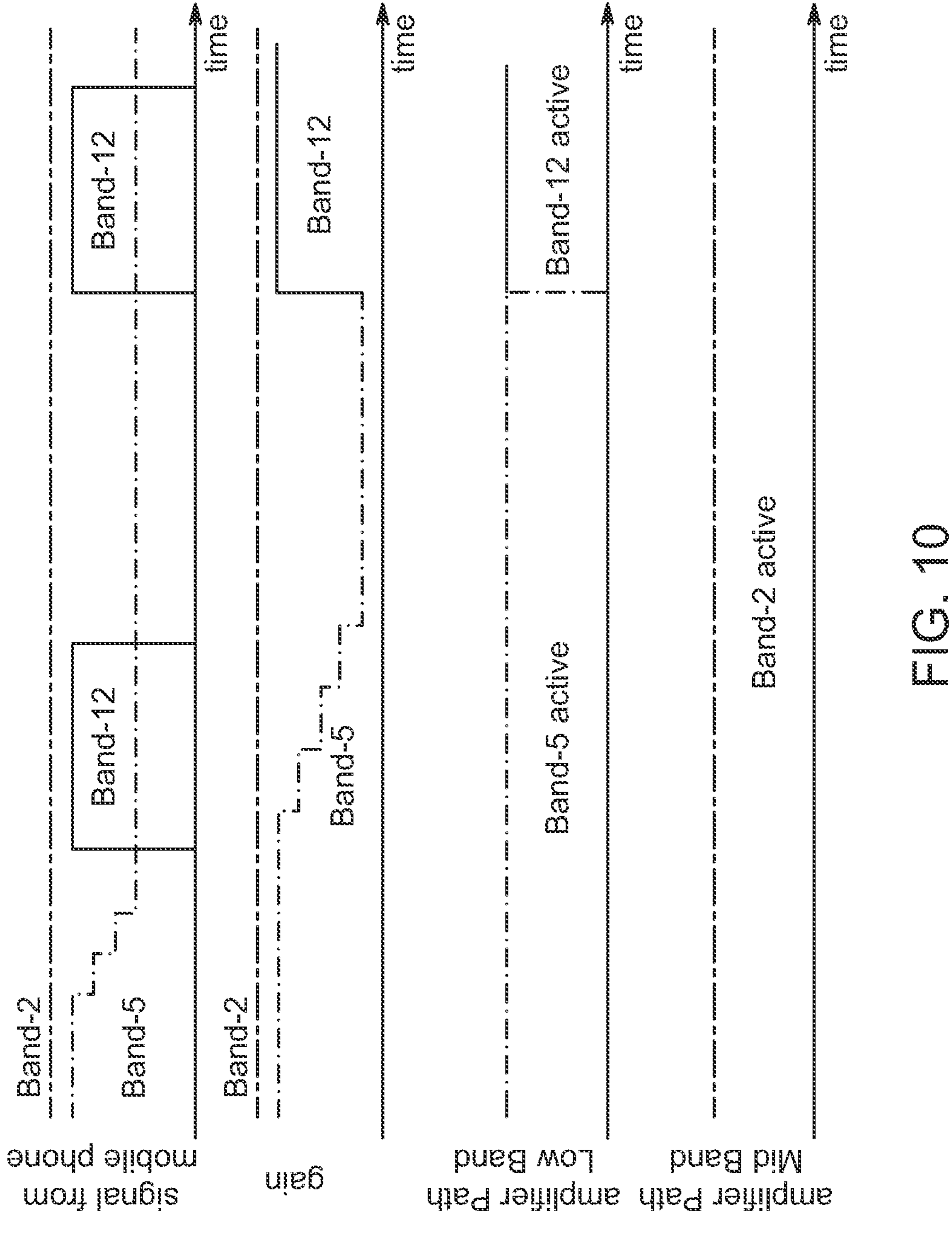

FIG. 10 includes four graphs respectively showing Band-2, Band-5, and Band-12 signals from a mobile phone, gain of the Band-2, Band-5, and Band-12 signals, an active state of the amplifier path for Low Band (LB), and an active state of the amplifier path for Mid Band (MB). In this example, the Band-5 signal is set to a minimum gain (e.g., 5 dB, 0 dB, −5 dB, etc.) to avoid overcompensation and when the Band-12 signal is detected, the Band-5 is deactivated and Band-12 activated, whereby Band-12 is amplified along the Low Band amplifier path.

Figure 11:
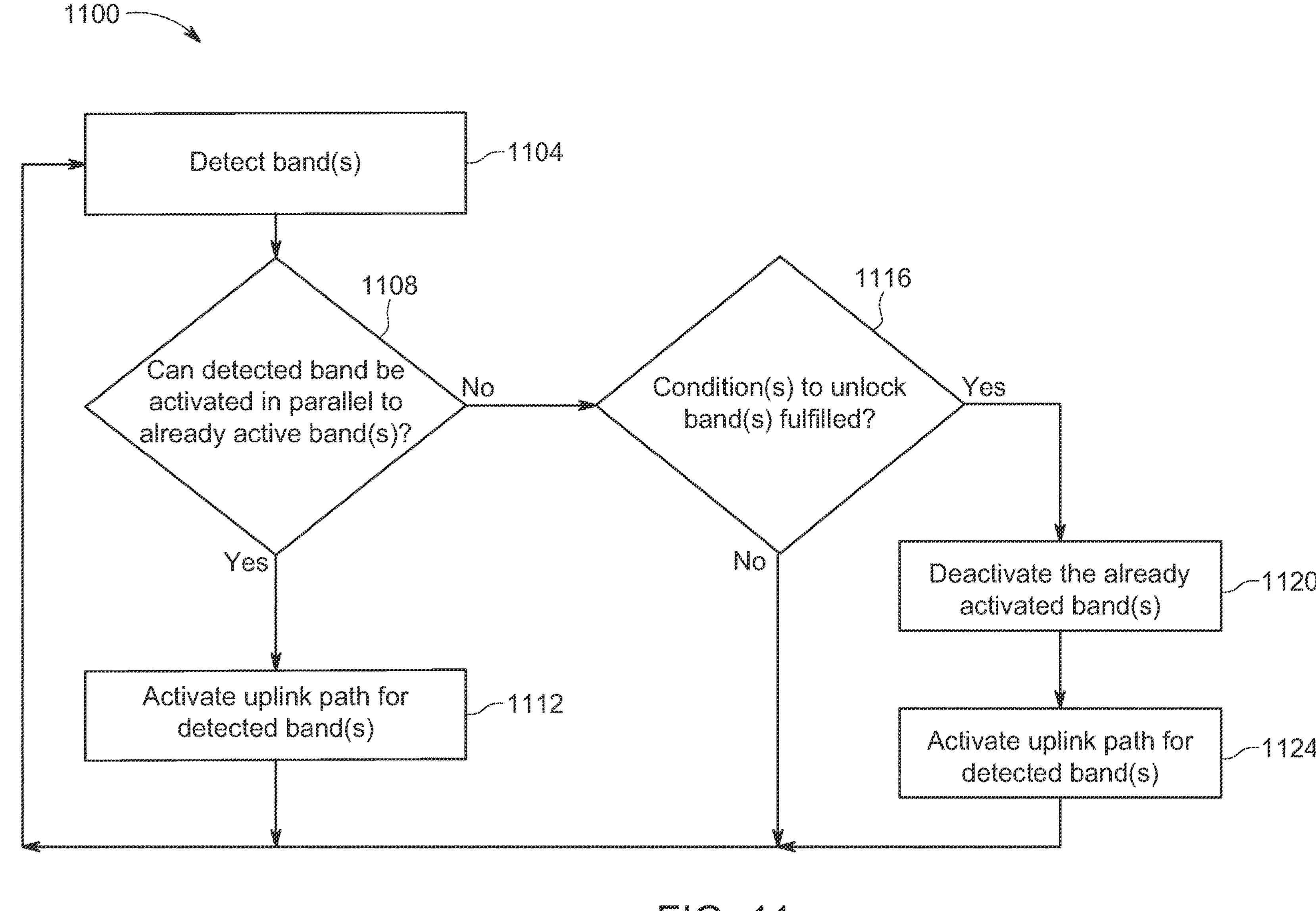

FIG. 11 is a flow chart of an example method for selectively amplifying multiple carriers in different frequency bands according to an exemplary embodiment of the present disclosure.

DETAILED DESCRIPTION

The detailed description that follows describes exemplary embodiments and the features disclosed are not intended to be limited to the expressly disclosed combination(s). Therefore, unless otherwise noted, features disclosed herein may be combined together to form additional combinations that were not otherwise shown for purposes of brevity.

For network access in the new 5G mobile communications standard "New Radio" NR, the Non-Stand-Alone (NSA) mode is implemented to use the preexisting 4G infrastructure. In this NSA mode, the terminal device (e.g., mobile phone, other user equipment, etc.) will use a primary 4G carrier for control plane signaling while a secondary 5G carrier is used for high-speed data traffic. Thus, the terminal device will send two carriers in the uplink direction in different frequency bands at the same time. This type of dual connectivity can also apply in Long-Term Evolution (LTE) and 5G New Radio (5G NR) only. A similar application is Uplink Inter-Band Carrier Aggregation.

As recognized herein, the following challenges/problems arise when two or more active uplink carriers in different cellular bands (inter band) are used at the same time by a mobile phone on the coupling antenna or additional user equipment (interferer) near the coupling antenna. A single carrier compensator can detect multiple bands but will only support one band at the same time. A multicarrier compensator can detect and support generally more than one band at the same time but cannot compensate all band combinations that can occur. As a result, conventional compensators may permanently and uncontrollably toggle the bands, which may lead to reduced signal quality, call drops, and unwanted interferences. Furthermore, additional user equipment near the coupling antenna can block the mobile phone on the coupling antenna.

Figure 1:
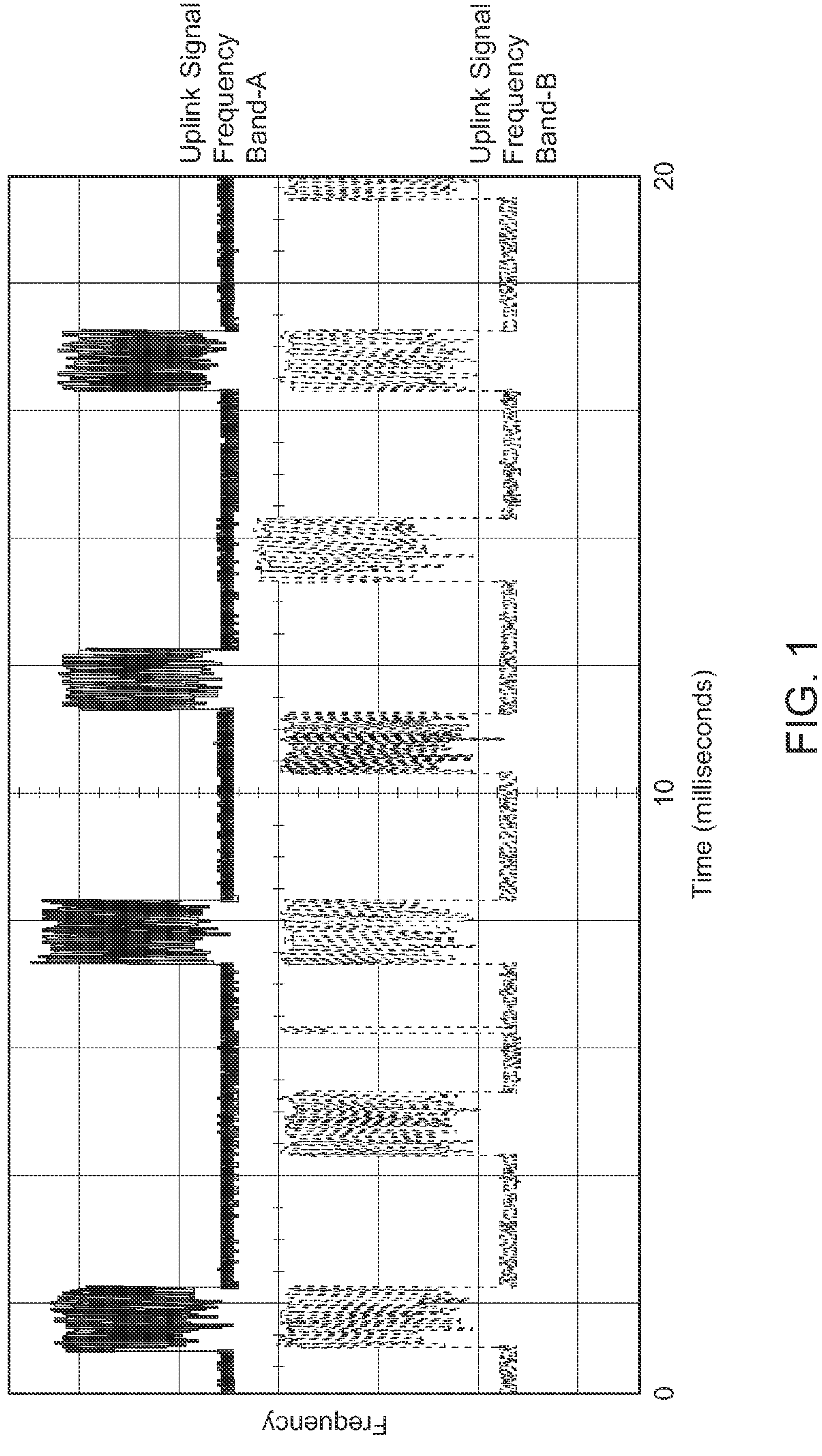
FIG. 1 illustrates an example of two uplink signals in frequency Band-A and frequency Band-B, respectively, from one mobile phone in 5G Non-Stand-Alone (NSA) mode over a time of 20 milliseconds.

FIG. 1 illustrates an example of two uplink signals from one mobile phone in 5G NSA mode over a time of 20 milliseconds. The higher frequency uplink signal is in frequency Band-A. The lower frequency uplink signal is in frequency Band-B. FIG. 1 generally shows how two inter band signals can occur, whereby the signal gaps and independent transmission increase the toggle effect.

Current solutions assume that the number of detected signals can always be supported in parallel. But this also means unwanted user equipment, which is generally not supported by the coupling system, must be located sufficiently far away from the coupling antenna that the signals transmitted by the unwanted user equipment are not detectable by the compensator.

After recognizing the above, exemplary embodiments of methods and devices (e.g., circuit, compensator, repeater, booster, signal amplifier device, etc.) were developed and/or are disclosed herein for selectively amplifying multiple carriers in different frequency bands. For example, the methods and devices disclosed herein may be used for selectively amplifying radio frequency (RF) signals in different frequency bands (e.g., 5G, 4G, etc.) between a terminal device (e.g., mobile phone, user equipment within a vehicle or elsewhere, a coupling antenna on a wireless charger, etc.) and an antenna (e.g., a vehicle roof antenna, etc.) or antenna connection, etc. Advantageously, the methods and devices disclosed herein may help prevent (or at least reduce) signal losses or interferences when multicarrier signals in different cellular bands are detected but are not supported in parallel and help to increase robustness against interfering signals.

Figure 2:
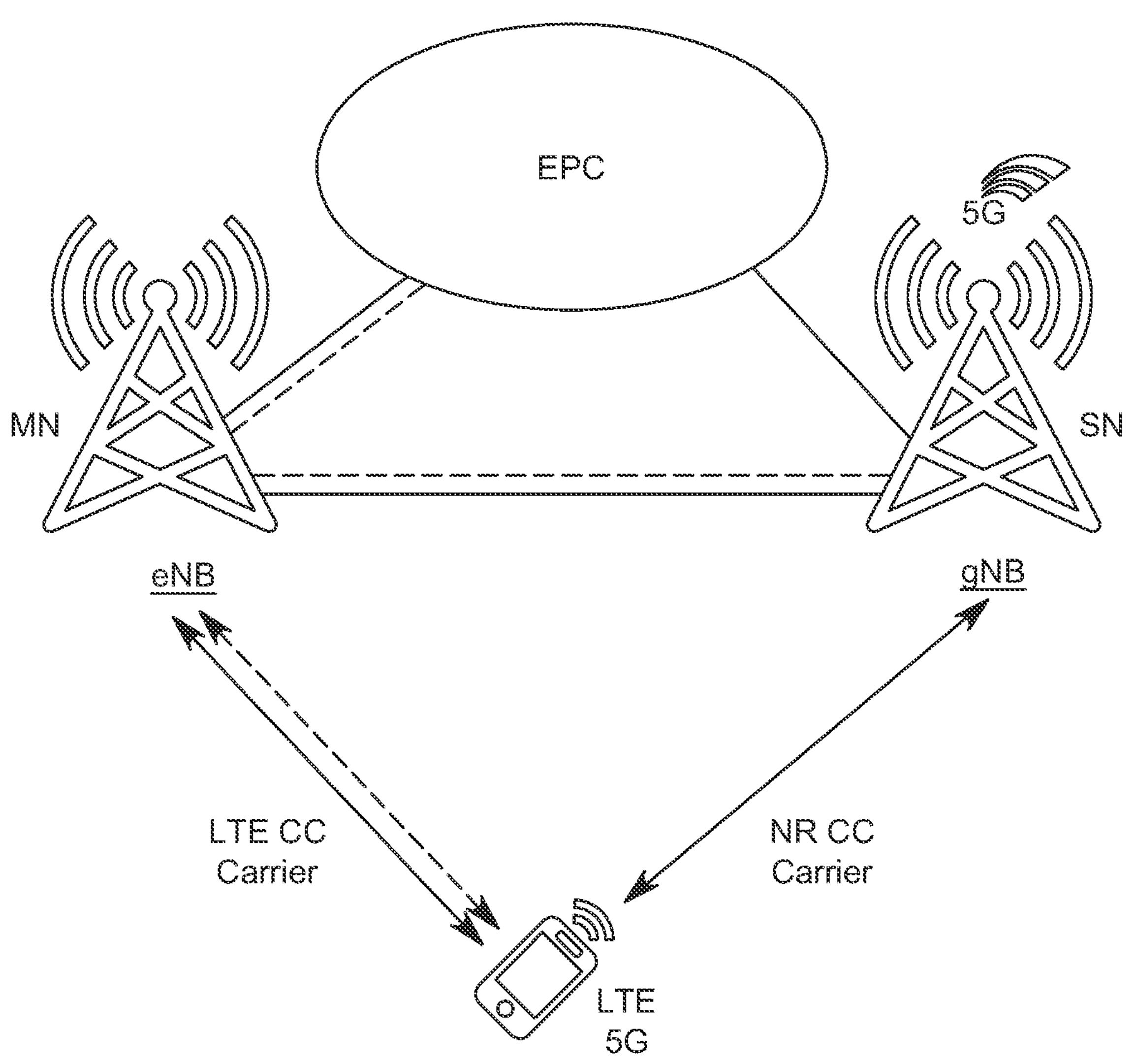
FIG. 2 illustrates communications between user equipment and an LTE base station (eNB) and a NR base station (gNB) in parallel, whereby control data is transmitted via the LTE carrier (CC) and user data via LTE and NR CC.

With continued reference to the figures, FIG. 2 illustrates user equipment communicating with an LTE base station (eNB) and NR base station (gNB) in parallel. Control data is transmitted via the LTE component carrier (CC) and user data via LTE and NR CC. 5G networks are normally launched in the non-standalone configuration, where operators can share the existing LTE core network (EPC) with 4G and 5G signals to save network invest and accelerate the market access.

Standalone (SA) and non-standalone (NSA) networks will coexist in the future by using either the 4G or 5G core network. As a consequence, user equipment must transmit several carriers simultaneously. In the uplink direction from the user equipment (UE) to EPC, two carriers are currently supported in parallel, which are transmitted in different frequency bands (inter band EN-DC).

Figure 3:
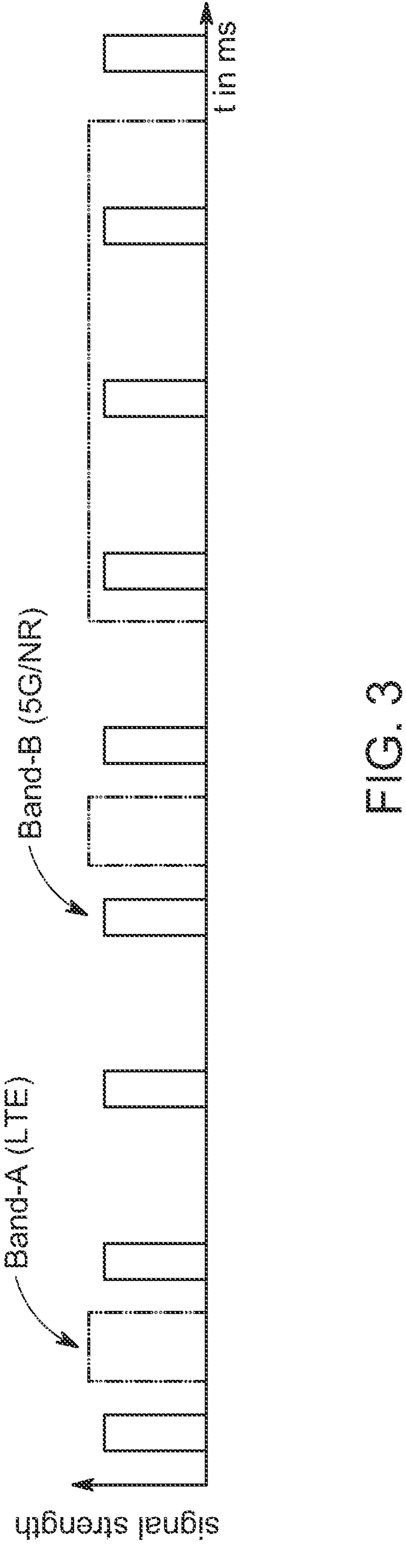
FIG. 3 illustrates measured signal strength of a mobile phone uplink signal for 5G NSA Mode.

FIG. 3 illustrates measured signal strength of a mobile phone uplink signal for 5G NSA Mode. The Band-A (LTE) signal is the uplink signal for the LTE anchor carrier. In this example, Band-A is a FDD (frequency division duplex) band, such as 3GPP Band 1, 2, 3, 20, or other LTE bands. The Band-B (5G/NR) signal is the uplink signal for NR. In this example, Band-B is a TDD (time division duplex) band, such NR 3GPP Band n41, n78, or other TDD bands. Band-B could also be a FDD band, such as Band n3, n1, n66, n71, or other NR bands.

In 5G NSA mode, both bands Band-A and Band-B are transmitted independently from each other. And there is no correlation in time. A compensator should therefore support both bands in parallel at the same time. The uplink signal is not permanently transmitted by the mobile phone. The uplink signal is dependent on the allocated resource blocks in time and frequency. This allocation is controlled by the base station. And transmission pauses of a few milliseconds occur depending on the data to be transmitted and the load of the mobile radio cell.

As recognized herein, a compensator should support the LTE component carrier and the NR component carrier in parallel with the band combinations of the user equipment (UE) to compensate losses. Many smartphones only support a limited combination of cellular bands in the non-standalone (NSA) mode. It may therefore be beneficial to configure a compensator similarly to only support a limited combinations of cellular bands in the NSA mode to avoid an excessively complex design for the compensator.

Figure 4:
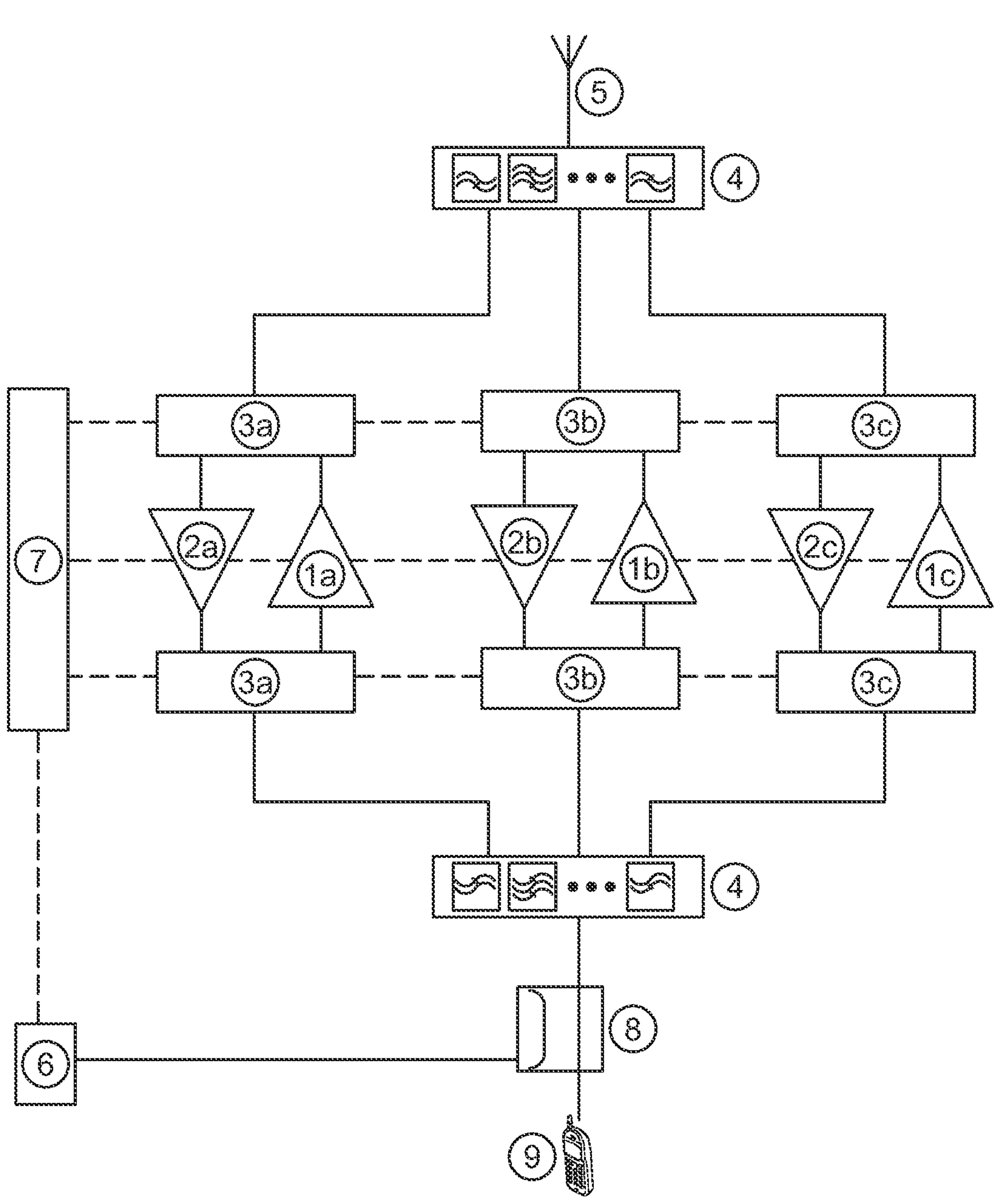
FIG. 4 is a block diagram of an example circuit arrangement for a compensator (e.g., a Molex Compenser™ signal amplifier device, etc.) that may be configured for selectively amplifying multiple carriers in different frequency bands according to an exemplary embodiment of the present disclosure.

The frequency spectrum may preferably be divided into frequency ranges that are supported in parallel (e.g., **3*a* low band, 3*b* mid band, and 3*c* high band in FIG. 4**, etc.). Several cellular bands can be part of one dedicated frequency range.

These cellular bands cannot be used in parallel, or in other words only bands in different frequency ranges can be supported.

FIG. 4 illustrates an example circuit arrangement for a compensator (e.g., a Molex Compenser™ signal amplifier device, etc.) that may be configured for selectively amplifying multiple carriers in different frequency bands according to an exemplary embodiment of the present disclosure. The example circuit arrangement shown in FIG. 4 is further described in German published patent application DE102019208987A1 and United States published application US2022/0263526, which are incorporated herein by reference in their entirety. But the example circuit arrangement shown in FIG. 4 is provided for illustration only as other circuit arrangements may also be configured for selectively amplifying multiple carriers in different frequency bands according to exemplary embodiments of the present disclosure.

With continued reference to FIG. 4, the circuit arrangement includes power amplifiers 1*a*, 1*b*, and 1*c* to amplify uplink signals from the mobile phone or other user equipment 9, which supports LTE and/or NR. The circuit arrangement also includes power amplifiers 2*a*, 2*b*, and 2*c* to amplify downlink signals from a base station to the mobile phone 9. The circuit arrangement further includes multiplexers 3*a*, 3*b*, 3C, a frequency multiplexer 4, a detector 6, and a directional coupler 8.

The multiplexers 3*a*, 3*b*, 3*c* could include RF-switches and/or filters and/or power dividers and/or a combination thereof (e.g., a combination of a power divider and filter, etc.). The multiplexers 3*a*, 3*b*, 3*c* could be bandpass or duplex filters to filter specific frequency bands, e.g., Band-1 or Band-n78, etc. The frequency multiplexer 4 is operable to split signals in different frequency ranges. The antenna 5 may comprise a vehicular antenna mounted on a vehicle rooftop, an antenna mounted elsewhere, etc.

The detector 6 is configured to determine signal strength of supported bands. By way of example, the detector may comprise a detector configured to detect multiple frequency bands as disclosed in published PCT International Patent Application WO2019086703A1, which is incorporated herein by reference in its entirety.

The control unit 7 is configured to analyze measured signals from the detector 6. The directional coupler 8 is configured to split the signal for amplification path and the detector 6.

The frequency multiplexer 4 is operable to split signals in different frequency ranges. For example, the frequency multiplexer 4 may split the frequencies in: Low-Band range from 600 MHz to 1 GHz for the amplification path (a), Mid-Band range from 1 GHz to 2.5 GHz for amplification path (b), and High-Band range from 2.5 GHz to 4 GHz for amplification path (c). The frequency multiplexer 4 may also be referred to as a diplexer, triplexer, or quadplexer. The frequencies listed in this paragraph are examples only as other frequency range selections are also possible.

By way of further example, the circuit arrangement may be configured to support frequency ranges with the following frequency bands: 3GPP Bands 5, 12, and 71 for the Low-Band (LB) amplifier path (a), 3GPP Bands 2, 4, and 66 for the Mid-Band (MB) amplifier path (b), and 3GPP Bands 41 and 78 for the High-Band (HB) amplifier path (c). The 3GPP frequency bands listed in this paragraph are examples only as other frequency bands are also possible.

In addition, the circuit arrangement may also be configured to support one band of LB, MB, HB in parallel. Although it is generally not possible to support two or more bands from LB in parallel, it is possible to support combinations of LB, MB, and HB in parallel. For example, the circuit arrangement may be configured to support the combination of the 3GPP Band-5 for the LB amplifier path (a) and the 3GPP Band-2 for the MB amplifier path (b). Or, for example, the circuit arrangement may be configured to support the combination of the 3GPP Band-12 for the LB amplifier path (a) and the 3GPP Band-66 for the MB amplifier path (b). As another example, the circuit arrangement may be configured to support the combination of the 3GPP Band-5 for the LB amplifier path (a) and the 3GPP Band-78 for the HB amplifier path (c). As yet another example, the circuit arrangement may be configured to support the combination of the 3GPP Band-2 for the MB amplifier path (b) and the 3GPP Band-41 for the HB amplifier path (c).

FIG. 5 includes three graphs respectively showing signals from a mobile phone including activated carriers, an active state of the amplifier path for Low-Band (LB), and an active state of the amplifier path for Mid-Band (MB). After a detection of a LB Band-5 signal, the amplifier path (a) for the low band frequency may be activated for Band-5. If a second band (MB Band-2 signal) is detected, then the amplifier path (b) may be activated to amplify Band-2. In this example, the compensator thus supports uplink carriers for both Band-5 and Band-2 by amplifying the uplink signal for Band-2 and the uplink signal for Band-5 in parallel.

As recognized herein, all detected bands may not be supported in parallel when two detected bands are from the same frequency range. All detected bands may also not be supported in parallel when there are more bands detected than can be supported in parallel. For example, a conventional LTE design may only support one band even when two or more bands are detected. Or, for example, a 5G design may support two bands in parallel but there may be three or more bands detected. As another example, all detected bands may not be supported in parallel when the compensator detects bands and/or is triggered by an interferer from additional user equipment or a new phone release supporting more than two component carriers. Additionally, all detected bands may not be supported in parallel when there is a handover of one component carrier from one Band to another Band.

With reference to FIG. 6, the following example shows a negative effect of detection and activation of uplink path when two bands are detected but the combination of bands are not supported by the compensator. For example, this may occur when two component carriers in different cellular bands are detected but the two component carriers are in the same frequency range.

In this example shown in FIG. 6, an uplink carrier aggregation is not supported for both low-bands Band-5 and Band-12. Both bands are transmitted on parallel by the mobile phone and uncorrelated in time. The amplifier path is activated if only one of the bands is detected. This leads to toggle effects that can lead to disruptions in communication. As disclosed herein, the negative toggle effects and disruptions in communication may be reduced by locking bands based on different specified conditions or parameter, e.g., time, signal power, frequency, etc.

For example, if a selected carrier(s) is not detected for a specified period of time (e.g., e.g., 10 milliseconds (ms), 40 ms, 100 ms, 200 ms, etc.), then the amplifier signal path(s) for the undetected selected carrier(s) may be locked or deactivated. And the previously locked/deactivated amplifier signal path(s) associated with the frequency band(s) of the unselected/locked carrier(s) may be unlocked/activated to thereby allow transmission of the unselected carrier(s) along the now unlocked/activated signal path(s) for amplification.

The example in FIG. 7 shows an active amplifier path for Band-2 and Band-5. But Band-5 is on hold for a specified period of time even though Band-12 is detected and Band-5 is inactive. If no Band-5 signal is detected for a specified period of time (e.g., 10 ms, 40 ms, 100 ms, 200 ms, etc.) and the Band-12 signal is detected, then the Low-Band amplifier path is deactivated for Band-5 and activated for Band-12 such that the Band-12 signal is amplified along the Low-Band amplifier path.

As another example, if the power of the selected carrier(s) is lower than the power of unselected/locked carrier(s) by a specified amount of preferably 10 decibels (dB) or more (e.g., 10 dB, 20 dB, more than 20 dB, etc.), then the amplifier signal path(s) for the selected carrier(s) may be locked or deactivated. And the previously locked amplifier signal path(s) associated with the frequency band(s) of the unselected/locked carrier(s) may be unlocked/activated to thereby allow transmission of the unselected carrier(s) along the now unlocked/activated signal path(s) for amplification.

The example in FIG. 8 shows that Band-5 is on hold until Band-12 is detected with a higher power than Band-5. This deactivates Band-5 and activates Band-12. The power of the newly activated Band-12 should be higher than the power of the active band preferably by a specified amount of 10 decibels (dB) or more (e.g., 10 dB, 20 dB, more than 20 dB, etc.).

In a further example, if the power of the selected carrier(s) falls below a specified threshold (e.g., −40 decibel-milliwatts (dBm), −30 dBm, −20 dBm, etc.) then the amplifier signal path(s) for the selected carrier(s) may be locked or deactivated. And the previously locked amplifier signal path(s) associated with the frequency band(s) of the unselected/locked carrier(s) may be unlocked/activated or unlocked to thereby allow transmission of the unselected carrier(s) along the now unlocked/activated signal path(s) for amplification.

The example in FIG. 9 shows that Band-5 is on hold until the detected power of the Band-5 signal falls below a specified amount or threshold (e.g., −40 decibel-milliwatts (dBm), −30 dBm, −20 dBm, etc.). When Band-5 signal is below the threshold and Band-12 signal is detected, then the Low-Band amplifier path is deactivated for Band-5 and activated for Band-12 such that the Band-12 signal is amplified along the Low-Band amplifier path. This procedure avoided that a detected signal (in example Band-5) from a nearby phone is amplified and locked the Band-12 signal from the supported phone.

In an additional example, if the gain of the selected carrier(s) falls below a specified minimum (e.g., −5 dB, 0 dB, or −5 dB, etc.), then the amplifier signal path(s) for the selected carrier(s) may be locked or deactivated. And the previously locked amplifier signal path(s) associated with the frequency band(s) of the unselected/locked carrier(s) may be unlocked/activated or unlocked to thereby allow transmission of the unselected carrier(s) along the unlocked signal path(s) for amplification. If the detected power of Band-5 signal falls too low, the gain of the Band-5 amplification path is preferably reduced to avoid an overcompensation. This type of overcompensation protection mechanism is disclosed in U.S. Pat. No. 9,602,148, which is incorporated herein by reference in its entirety.

In the example shown in FIG. 10, the Band-5 signal is no longer on hold when the gain of the Band-5 path is set to a lower or minimum gain. In this case, the reduced gain could be, for example, 5 dB, 0 dB, −5 dB, etc., preferably gain value is the loss of coupling if not fully compensated. When the Band-5 signal is set to the minimum gain to avoid overcompensation and the Band-12 signal is detected, then the Low-Band amplifier path is deactivated for Band-5 and activated for Band-12 such that the Band-12 signal is amplified along the Low-Band amplifier path. In this case, the Band-5 signal does not need any amplification and the compensator could support the detected Band-12.

FIG. 11 is a flow chart of an example method for selectively amplifying multiple carriers in different frequency bands according to an exemplary embodiment of the present disclosure. In this exemplary method, band(s) (e.g., Band-2, Band-5, Band-12, etc.) are detected at 1104.

At 1108, a determination is made as to whether or not the detected band(s) can be activated in parallel to the already active band(s). If it is determined at 1108 that the detected band(s) can be activated in parallel to the already active band(s), then the method proceeds to activate the uplink path for the detected band(s) at 1112.

But if it is determined at 1108 that the detected band(s) cannot be activated in parallel to the already active band(s), then the method proceeds to 1116 at which a determination is made as to whether or not one or more specified conditions are satisfied or fulfilled to unlock the detected band(s). For example, and as disclosed herein, the one or more conditions may include whether the already activated band(s) is not detected for a specified period of time (e.g., FIG. 7, etc.), whether the power of the already activated band(s) is lower than the power of the detected band(s) by a specified amount (e.g., FIG. 8, etc.), the power of the already activated band(s) falls below a specified threshold (e.g., FIG. 9, etc.), and/or the gain of the already activated band(s) is reduced to a specified minimum gain value (e.g., FIG. 10, etc.).

If it is determined at 1116 that the specified condition(s) is satisfied or fulfilled to unlock the detected band(s), then the already activated band(s) are deactivated at 1120 and the uplink path for the detected band(s) are activated at 1124.

Accordingly, exemplary embodiments are disclosed of methods and devices (e.g., circuit, compensator, repeater, booster, signal amplifier device, etc.) for selectively amplifying multiple carriers in different frequency bands. For example, the methods and devices disclosed herein may be used for selectively amplifying radio frequency (RF) signals in different frequency bands (e.g., 5G, 4G, etc.) between a terminal device (e.g., mobile phone, user equipment within a vehicle, a coupling antenna on a wireless charger, etc.) and an antenna (e.g., a vehicle roof antenna, etc.) or antenna connection, etc.

In exemplary embodiments, a circuit includes a detector configured for detecting carriers in different frequency bands, multiple signal paths respectively configured for amplifying multiple carriers in different frequency bands, and a control unit configured for controlling the detector and the multiple signal paths. The control unit is further configured to: select the carrier(s) to be compensated based on one or more first specified conditions and allow transmission of the selected carrier(s) along the corresponding signal path(s) for amplification; and lock the signal path(s) associated with the frequency band(s) of the unselected carrier(s) to prevent transmission of the unselected carrier(s) along the locked signal path(s) until one or more second specified conditions are satisfied.

In exemplary embodiments, the control unit is configured to determine if the carriers detected by the detector exceed a maximum number of carriers capable of being supported in parallel. If it is determined that the carriers detected by the detector exceed the maximum number of carriers capable of being supported in parallel, the control unit is configured to: select the carrier(s) to be compensated based on the one or more first specified conditions and allow transmission of the selected carrier(s) along the corresponding signal path(s) for amplification; and lock the signal path(s) associated with the frequency band(s) of the unselected carrier(s) to prevent transmission of the unselected carrier(s) along the locked signal path(s) until the one or more second specified conditions are satisfied.

In exemplary embodiments, the control unit is configured to select the carrier(s) to be compensated based on the one or more first specified conditions including: selecting the carrier(s) with the highest power; and/or selecting the carrier(s) within a specified frequency band.

In exemplary embodiments, the control unit is configured to select the carrier(s) to be compensated based on the one or more first specified conditions including selecting the carrier(s) having a 5G frequency instead of selecting the carrier(s) having a 4G frequency.

In exemplary embodiments, the control unit is configured to lock the signal path(s) associated with the frequency band(s) of the unselected carrier(s) until the one or more second specified conditions are satisfied including one or more of: the selected carrier(s) is not detected for a specified period of time (e.g., 10 milliseconds (ms), 40 ms, 100 ms, 200 ms, etc.); and/or the power of the selected carrier(s) is lower than the power of the unselected carrier(s) by a specified amount (e.g., 10 decibels (dB), 20 dB, more than 20 dB, etc.); and/or the power of the selected carrier(s) falls below a specified threshold (e.g., −40 decibel-milliwatts (dBm), −30 dBm, or −20 dBm, etc.); and/or the gain of the selected carrier(s) is reduced to a specified minimum gain value (e.g., 5 dB, 0 dB, −5 dB, etc.).

In exemplary embodiments, the control unit is configured to unlock the locked signal path(s) associated with the frequency band(s) of the unselected carrier(s) and allow transmission of the unselected carrier(s) along the unlocked signal path(s) for amplification when the one or more second specified conditions are satisfied including one or more of: the selected carrier(s) is not detected for a specified period of time (e.g., 10 milliseconds (ms), 40 ms, 100 ms, 200 ms, etc.); and/or the power of the selected carrier(s) is lower than the power of the unselected carrier(s) by a specified amount (e.g., 10 decibels (dB), 20 dB, more than 20 dB, etc.); and/or the power of the selected carrier(s) falls below a specified threshold (e.g., −40 decibel-milliwatts (dBm), −30 dBm, or −20 dBm, etc.); and/or the gain of the selected carrier(s) is reduced to a specified minimum gain value (e.g., 5 dB, 0 dB, −5 dB, etc.).

In exemplary embodiments, the multiple signal paths include at least one or more of: a first signal path configured for amplifying a carrier having a frequency within a first frequency band; and a second signal path configured for amplifying a carrier having a frequency within a second frequency band different and non-overlapping with the first frequency band. The first frequency band may be a 5G frequency band, and the second frequency band may be a 4G frequency band. For example, the first frequency band may be the Cellular Band n78 from 3.3 gigahertz (GHz) to 3.8 GHz; and/or the second frequency band may be the Cellular Band 2 from about 1.85 GHz to about 1.91 GHz. Or for example, the first frequency band may be the Cellular Band n78 from 3.3 gigahertz (GHz) to 3.8 GHz, and/or the second frequency band may be the LTE Band-1 and/or LTE Band-20. As yet another example, the first frequency band may be the Cellular Band n78 from 3.3 gigahertz (GHz) to 3.8 GHz, and/or the second frequency band may be the LTE Band-2 and/or LTE Band-12.

In exemplary embodiments, the control unit is configured to: select two or more carriers in different frequency bands to be compensated based on the one or more first specified conditions; and allow transmission of the selected two or more carriers along the corresponding signal paths associated with the different frequency bands of the selected two or more carriers for amplification at substantially the same time.

In exemplary embodiments, the control unit is configured to lock one or more signal paths associated with the frequency bands of one or more unselected carriers to prevent transmission of the one or more unselected carriers along the locked one or more signal paths until the one or more second specified conditions are satisfied.

In exemplary embodiments, the circuit is configured to be operable for amplifying signals in different frequency bands between a terminal device and an antenna or an antenna connection.

In exemplary embodiments, the circuit is configured to be operable for preventing signal losses or interferences when the detector detects multicarrier signals in different cellular bands that are not supported in parallel.

In exemplary embodiments, a compensator or signal amplifier device includes a circuit as disclosed herein.

In exemplary embodiments, a vehicular communication system includes at least one antenna configured to be operable for transmitting and receiving signals to/from a terminal device, and a circuit as disclosed herein.

Exemplary embodiments are also disclosed of methods of selectively amplifying multiple carriers in different frequency bands. The method comprises detecting carriers in different frequency bands; selecting the carrier(s) to be compensated based on one or more first specified conditions and allowing transmission of the selected carrier(s) along corresponding signal path(s) for amplification; and locking signal path(s) associated with the frequency band(s) of the unselected carrier(s) to prevent transmission of the unselected carrier(s) along the locked signal path(s) until one or more second specified conditions are satisfied.

In exemplary embodiments, the method includes determining if the carriers detected exceed a maximum number of carriers capable of being supported in parallel. If it is determined that the carriers detected exceed the maximum number of carriers capable of being supported in parallel, then the method includes: selecting the carrier(s) to be compensated based on the one or more first specified conditions and allowing transmission of the selected carrier(s) along the corresponding signal path(s) for amplification; and locking the signal path(s) associated with the frequency band(s) of the unselected carrier(s) to prevent transmission of the unselected carrier(s) along the locked signal path(s) until the one or more second specified conditions are satisfied.

In exemplary embodiments, selecting the carrier(s) to be compensated based on one or more first specified conditions includes: selecting the carrier(s) with the highest power; and/or selecting the carrier(s) within a specified frequency band.

In exemplary embodiments, selecting the carrier(s) to be compensated based on one or more first specified conditions includes selecting the carrier(s) having a 5G frequency instead of selecting the carrier(s) having a 4G frequency.

In exemplary embodiments, locking signal path(s) associated with the frequency band(s) of the unselected carrier(s)

includes: locking the signal path(s) associated with the frequency band(s) of the unselected carrier(s) until the selected carrier(s) is not detected for a specified period of time (e.g., 10 milliseconds (ms), 40 ms, 100 ms, 200 ms, etc.); and/or locking the signal path(s) associated with the frequency band(s) of the unselected carrier(s) until the power of the selected carrier(s) is lower than the power of the unselected carrier(s) by a specified amount (e.g., 10 decibels (dB), 20 dB, more than 20 dB, etc.); and/or locking the signal path(s) associated with the frequency band(s) of the unselected carrier(s) until the power of the selected carrier(s) falls below a specified threshold (e.g., −40 decibel-milliwatts (dBm), −30 dBm, or −20 dBm, etc.); and/or locking the signal path(s) associated with the frequency band(s) of the unselected carrier(s) until the gain of the selected carrier(s) is reduced to a specified minimum gain value (e.g., 5 dB, 0 dB, −5 dB, etc.).

In exemplary embodiments, the method includes unlocking the locked signal path(s) associated with the frequency band(s) of the unselected carrier(s) and allowing transmission of the unselected carrier(s) along the unlocked signal path(s) for amplification when the one or more second specified conditions are satisfied including one or more of: the selected carrier(s) is not detected for a period of time (e.g., 10 milliseconds (ms), 40 ms, 100 ms, 200 ms, etc.); and/or the power of the selected carrier(s) is lower than the power of the unselected carrier(s) by a specified amount (e.g., 10 decibels (dB), 20 dB, more than 20 dB, etc.); and/or the power of the selected carrier(s) falls below a specified threshold (e.g., −40 decibel-milliwatts (dBm), −30 dBm, or −20 dBm, etc.); and/or the gain of the selected carrier(s) is reduced to a specified minimum gain value (e.g., 5 dB, 0 dB, −5 dB, etc.).

In exemplary embodiments, the signal paths include at least one or more of: a first signal path configured for amplifying a carrier having a frequency within a first frequency band; and a second signal path configured for amplifying a carrier having a frequency within a second frequency band different and non-overlapping with the first frequency band. The first frequency band may be a 5G frequency band, and the second frequency band may be a 4G frequency band. For example, the first frequency band may be the Cellular Band n78 from 3.3 gigahertz (GHz) to 3.8 GHz; and/or the second frequency band may be the Cellular Band 2 from about 1.85 GHz to about 1.91 GHz. Or for example, the first frequency band may be the Cellular Band n78 from 3.3 gigahertz (GHz) to 3.8 GHz, and/or the second frequency band may be the LTE Band-1 and/or LTE Band-20. As yet another example, the first frequency band may be the Cellular Band n78 from 3.3 gigahertz (GHz) to 3.8 GHz, and/or the second frequency band may be the LTE Band-2 and/or LTE Band-12.

In exemplary embodiments, the method includes: selecting two or more carriers in different frequency bands to be compensated based on the one or more first specified conditions; and allowing transmission of the selected two or more carriers along the corresponding signal paths associated with the different frequency bands of the selected two or more carriers for amplification at substantially the same time.

In exemplary embodiments, the method includes locking one or more signal paths associated with frequency bands of one or more unselected carriers to prevent transmission of the one or more unselected carriers along the locked one or more signal paths until the one or more second specified conditions are satisfied.

In exemplary embodiments, the method includes amplifying signals between a terminal device and an antenna or an antenna connection.

In exemplary embodiments, the method includes preventing signal losses or interferences when multicarrier signals in different cellular bands are detected that are not supported in parallel.

In exemplary embodiments, a compensator or signal amplifier device is configured to perform a method of selectively amplifying multiple carriers in different frequency bands as disclosed herein.

A circuit disclosed herein may be used to amplify signals between a terminal device and an antenna or antenna connection. The amplification of the signals by the circuit compensates for the attenuation of the signal power between the terminal device and the antenna or antenna connection. By way of example, the terminal device is an electronic device capable of performing wireless communications, such as a mobile phone, a smartphone, a modem, a radio module, user equipment within a motor vehicle or located elsewhere, etc. Also, by way of example, the antenna may be an antenna externally mounted on a motor vehicle (e.g., a vehicular rooftop antenna, etc.), an antenna located elsewhere, or an antenna connection. The terminal device and the antenna themselves are not part of the circuit. The circuits disclosed herein may be used in various applications and should not be limited to use with motor vehicles only.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

We claim:

1. A circuit comprising:

a detector configured to detect carriers for transmission;

multiple signal paths, each signal path among the multiple signal paths being configured to amplify multiple carriers in a frequency band associated with the signal path, wherein the frequency band associated with the signal path is different from frequency bands associated with other signal paths among the multiple signal paths; and a control unit configured for controlling the detector and the multiple signal paths, wherein the control unit is further configured to:

select at least one selected carrier among the carriers for transmission based on one or more first specified conditions, wherein all carriers among the carriers for transmission that are not among the at least one selected carrier are unselected carriers, and allow transmission of the at least one selected carrier along at least one signal path among the multiple signal paths that correspond to the frequency band(s) of the at least one selected carrier; and lock use of the multiple signal paths by the unselected carriers to prevent transmission of the unselected carriers until one or more second specified conditions are satisfied.

2. The circuit of claim 1, wherein:

the control unit is configured to determine if a number of the carriers for transmission detected by the detector exceeds a maximum number of carriers capable of being supported in parallel; and if it is determined that the number of the carriers for transmission detected by the detector exceed the maximum number of carriers capable of being supported in parallel, the control unit is configured to:

select the at least one selected carrier based on the one or more first specified conditions and allow transmission of the at least one selected carrier; and lock use of the multiple signal paths by the unselected carriers to prevent transmission of the unselected carriers until one or more second specified conditions are satisfied.

3. The circuit of claim 1, wherein the one or more first specified conditions includes:

the at least one selected carrier being the carriers for transmission with highest power; and/or the at least one selected carrier being within a specified frequency band.

4. The circuit of claim 1, wherein the one or more first specified conditions includes the at least one selected carrier having a 5G frequency instead of a 4G frequency.

5. The circuit of claim 1, wherein the one or more second specified conditions includes one or more of:

the at least one selected carrier is not detected for a specified period of time; and/or a power of the at least one selected carrier is lower than a power of the unselected carriers by a specified amount; and/or the power of the at least one selected carrier falls below a specified threshold; and/or a gain of the at least one selected carrier is reduced to a specified minimum gain value.

6. The circuit of claim 1, wherein the control unit is configured to unlock use of signal paths among the multiple signal paths associated with the frequency bands of the unselected carriers and allow transmission of the unselected carriers when the one or more second specified conditions are satisfied, the one or more second specified conditions including one or more of:

the at least one selected carrier is not detected for a specified period of time; and/or a power of the at least one selected carrier is lower than a power of the unselected carriers by a specified amount; and/or the power of the at least one selected carrier falls below a specified threshold; and/or a gain of the at least one selected carrier is reduced to a specified minimum gain value.

7. The circuit of claim 1, wherein the multiple signal paths include at least one or more of:

a first signal path configured for amplifying a carrier having a frequency within a first frequency band; and a second signal path configured for amplifying a carrier having a frequency within a second frequency band different and non-overlapping with the first frequency band.

8. The circuit of claim 7, wherein:

the first frequency band is a 5G frequency band; and/or the second frequency band is a 4G frequency band.

9. The circuit of claim 7, wherein the first frequency band is the Cellular Band n78 from 3.3 gigahertz (GHz) to 3.8 GHz; and/or wherein:

the second frequency band is the Cellular Band 2 from about 1.85 GHz to about 1.91 GHz; and/or the second frequency band is the LTE Band-1, LTE Band-2, LTE Band-12, and/or LTE-Band-20.

10. The circuit of claim 1, wherein the control unit is configured to:

select, as selected carriers, two or more carriers in different frequency bands; and allow transmission of the two or more carriers along signal paths among the multiple signal paths that are associated with the different frequency bands of the two or more carriers at substantially the same time.

11. The circuit of claim 1, wherein the circuit is configured to be operable for amplifying signals in different frequency bands between a terminal device and an antenna or an antenna connection.

12. The circuit of claim 1, wherein the circuit is configured to be operable for preventing signal losses or interferences when the detector detects multicarrier signals in different cellular bands that are not supported in parallel.

13. A method of selectively amplifying multiple carriers in different frequency bands, the method comprising:

detecting carriers for transmission; and selecting at least one selected carrier among the carriers for transmission based on one or more first specified conditions, wherein all carriers among the carriers for transmission that are not among the at least one selected carrier are unselected carriers, and allowing amplification and transmission of the at least one selected carrier along corresponding at least one signal path; and locking use of the signal paths by the unselected carriers to prevent transmission of the unselected carriers until one or more second specified conditions are satisfied.

14. The method of claim 13, wherein:

the method includes determining if a number of the carriers for transmission detected exceeds a maximum number of carriers capable of being supported in parallel; and if it is determined that the number of the carriers for transmission detected exceed the maximum number of carriers capable of being supported in parallel, then the method includes:

selecting the at least one selected carrier based on the one or more first specified conditions and allowing transmission of the selected carrier(s); and locking use of the signal paths by the unselected carriers to prevent transmission of the unselected carriers until the one or more second specified conditions are satisfied.

15. The method of claim 13, wherein selecting the selected carriers based on one or more first specified conditions includes:

selecting the at least one selected carrier as those with highest power; and/or selecting the at least one selected carrier as those within a specified frequency band.

16. The method of claim 13, wherein selecting the at least one selected carrier based on the one or more first specified conditions includes selecting the carriers for transmission having a 5G frequency instead of selecting the carriers for transmission having a 4G frequency.

17. The method of claim 13, wherein locking use of the signal paths by the unselected carriers includes:

locking use of the signal paths by the unselected carriers until the at least one selected carrier is not detected for a specified period of time; and/or locking use of the signal paths by the unselected carriers until a power of the at least one selected carrier is lower than a power of the unselected carriers by a specified amount; and/or locking use of the signal paths by the unselected carriers until the power of the at least one selected carrier falls below a specified threshold; and/or locking use of the signal paths by the unselected carriers until a gain of the at least one selected carrier is reduced to a specified minimum gain value.

18. The method of claim 13, wherein the method includes unlocking use of the signal paths associated with the frequency bands of the unselected carriers and allowing transmission of the unselected carriers when the one or more second specified conditions are satisfied, the one or more second specified conditions including one or more of:

the at least one selected carrier is not detected for a specified period of time; and/or a power of the at least one selected carrier is lower than a power of the unselected carriers by a specified amount; and/or the power of the at least one selected carrier falls below a specified threshold; and/or a gain of the at least one selected carrier is reduced to a specified minimum gain value.

19. The method of claim 13, wherein the signal paths include at least one or more of:

a first signal path configured for amplifying a carrier having a frequency within a first frequency band; and a second signal path configured for amplifying a carrier having a frequency within a second frequency band different and non-overlapping with the first frequency band.

* * * * *